United States Patent [19]

Payson et al.

[11] Patent Number: 5,414,524
[45] Date of Patent: May 9, 1995

[54] IMAGE RENDERING CLIP REGISTERS

[75] Inventors: Christopher J. Payson, Nashua, N.H.; Timothy M. Hellman, Watertown, Mass.

[73] Assignee: Digital Equipment Corporation, Maynard, Mass.

[21] Appl. No.: 820,533

[22] Filed: Jan. 14, 1992

[51] Int. Cl.⁶ .................................... H04N 1/41
[52] U.S. Cl. ........................ 358/426; 358/448; 358/453
[58] Field of Search ............ 358/426, 261.3, 432, 358/433, 434, 443, 404, 444, 448, 22, 453, 427, 125, 126; 382/41, 46, 54, 44, 9; 340/723

[56] References Cited

U.S. PATENT DOCUMENTS

| | | | |
|---|---|---|---|
| 4,492,956 | 1/1985 | Collmeyer et al. | 340/723 |
| 4,814,755 | 3/1989 | Johnson et al. | 340/709 |
| 4,972,330 | 11/1990 | Matsushiro et al. | 364/521 |
| 5,040,130 | 8/1991 | Chang et al. | 340/729 |
| 5,157,764 | 10/1992 | Priem et al. | 395/134 |
| 5,195,177 | 3/1993 | Kaniyama et al. | 395/134 |

Primary Examiner—Stephen Brinich
Assistant Examiner—Jerome Grant, II
Attorney, Agent, or Firm—Albert P. Cefalo; Ronald C. Hudgens; Mary M. Steubing

[57] ABSTRACT

A clipping circuit and method for selecting a rectangular region of interest from an image comprised of scan lines of pixels. The circuit stores the lengths of the portions of scan lines inside and outside the region of interest. A data decompression unit presents image data to the clipping circuit in scan line order. When pixels from the portion of a scan line within the region of interest are processed, the circuit passes the pixels through the system. When pixels outside the region are processed, they are blocked from further processing by the circuit.

22 Claims, 7 Drawing Sheets

CLIPPING CASES

N1 = 0, N2 = ROI WIDTH, N3 = RIGHT PIXELS

FIG. 3A

N1 = LEFT PIXELS, N2 = ROI WIDTH, N3 = RIGHT PIXELS

FIG. 3B

N1 = LEFT PIXELS, N2 = ROI WIDTH, N3 = 0

FIG. 3C

N1 = 0, N2 = ROI WIDTH (IMAGE WIDTH), N3 = 3

IMAGE RENDERING CLIP REGISTERS

BACKGROUND OF THE INVENTION

Images are often represented by very large data objects. Some data processing systems store information defining the states of individual pixels which make up the image. However, because of the large amount of data involved, efficient manipulation of the image requires that the data be compressed for storage and then decompressed for processing.

Various compression schemes are used in storing image data. The scheme used depends upon the system processing the data, but most work by recognizing patterns in the data and storing a description of the pattern rather than the data itself. For example, bitonal images are composed of black and white pixels arranged in horizontal rows called scan lines. The state of each pixel is represented by either a 1 or a 0; 1 being a black pixel and 0 being a white pixel. In many images, there are large areas which are all white or all black. These areas correspond to a large number of 0 or 1 pixels. Storing and processing all of these 0s or 1s is inefficient with respect to both system memory usage and speed. Compression allows storing a code which defines the number of consecutive pixels which are the same. When the compressed data is decompressed, it is presented in scan line order, that is, the pixels are output from the decompression process scan line by scan line, from the top of the image to the bottom, with the pixels within each scan line being ordered from left to right. Thus, much less memory space is used to store the image, but the image must be decompressed to view it.

Because images like engineering drawings are often very large, it is difficult to fit an entire image on the display screen of an image processing system while maintaining legibility of fine details. It is often convenient to view only the portion of the image which is of interest. Thus a "zoom" function is performed in which only a selected region of interest is viewed and all the details of the image within the region can be distinguished.

Selection of a region of interest also provides a convenience in processing. Since only the data within the region is to be processed, data from outside the region can be ignored by the system. This can result in significant reduction in processing. A process known as clipping is used to select data within the region of interest from the entire original image data object. When compressed image data is decompressed in scan line order by dedicated hardware devices, software algorithms within the devices preserve the data inside the region of interest. This data is allowed to continue through the system for further processing, while data outside the region is ignored by the system.

SUMMARY OF THE INVENTION

In accordance with the present invention, an image processing system includes a decompression unit which expands compressed code to pixel data values from scan line to scan line. A clipping circuit selectively passes pixel data within each scan line which is within a region of interest. The clipping circuit blocks pixel data values which are not within the region of interest.

The preferred clipping circuit includes a control circuit which passes pixel data values within a rectangular region of interest in a first pass state and blocks the pixel data values outside the region of interest in a second pass state. Length registers store lengths of portions of scan lines where each length is a count or quantity of pixels within and outside of the region of interest. A counter circuit is coupled to receive the lengths from the registers and to count pixel data values applied to the control circuit. The counter circuit changes the control circuit pass state and resets the counter circuit to new lengths from the registers as lengths of pixel values are counted. The register and initial counter values are calculated and preset by the controlling software before any image data is processed. During processing, the counter is advanced each time a new pixel passes into the clipping logic. With this simple circuit, image data can be clipped to regions of interest in real time on a line by line basis.

In one embodiment, a first register stores the value representing the quantity of pixels in a scan line to the left of the region of interest, a second register stores the value representing the quantity of pixels in the scan line within the region of interest, and a third register stores a value representing the quantity of pixels in the scan line to the right of the region of interest. Each length stored in the registers is in turn applied to and counted by a counter, and only pixel values received during the region of interest count are passed. However, in a preferred embodiment only two registers are used. One register stores the length within the region of interest and the other register may store the total length of regions to the left and right to be clipped. With proper initial setting of the counter for the first scan line, the two values stored in the registers can alternately be applied to the counter and achieve the same results as the three register embodiment. Preferably, the counter always receives its count length from the same one of the two registers, and the values in the two registers are alternated between the registers. More specifically, a terminal count signal causes the quantity stored in the first register to be loaded into the counter and into the second register, and a quantity stored in the second register to be loaded into the first register.

The clipping circuit of the present invention provides an image processing system with several advantages. Because the clipping is done in hardware, it can be done at very high speed. Although clipping can be done in software, the speed of the process is greatly reduced. Therefore, the clipping circuit assists in the presentation of images on a display at an interactive rate, i.e., as fast as the user can ask for them.

The hardware clipping circuit also relieves the system processor of much of the processing load. The processor which reads output pixel data from the circuit only reads data from within the region of interest. It wastes no read cycles on data it would subsequently ignore anyway. Also, there is a corresponding savings in memory space because the processor is only storing data from within the region of interest. When included in a hardware pipeline designed for fast image rendering, this clipping circuit reduces the workload on pipeline elements that follow it by reducing the amount of data to process. These elements can include image mirroring, rotating, scaling and others.

The preferred clipping circuit also requires only simple associated control logic. As a result, it can be implemented in small inexpensive programmable logic devices. This saves space, power, manufacturing time and parts-count and provides the system with improved reliability.

DETAILED DESCRIPTION OF THE INVENTION

Figure 1:
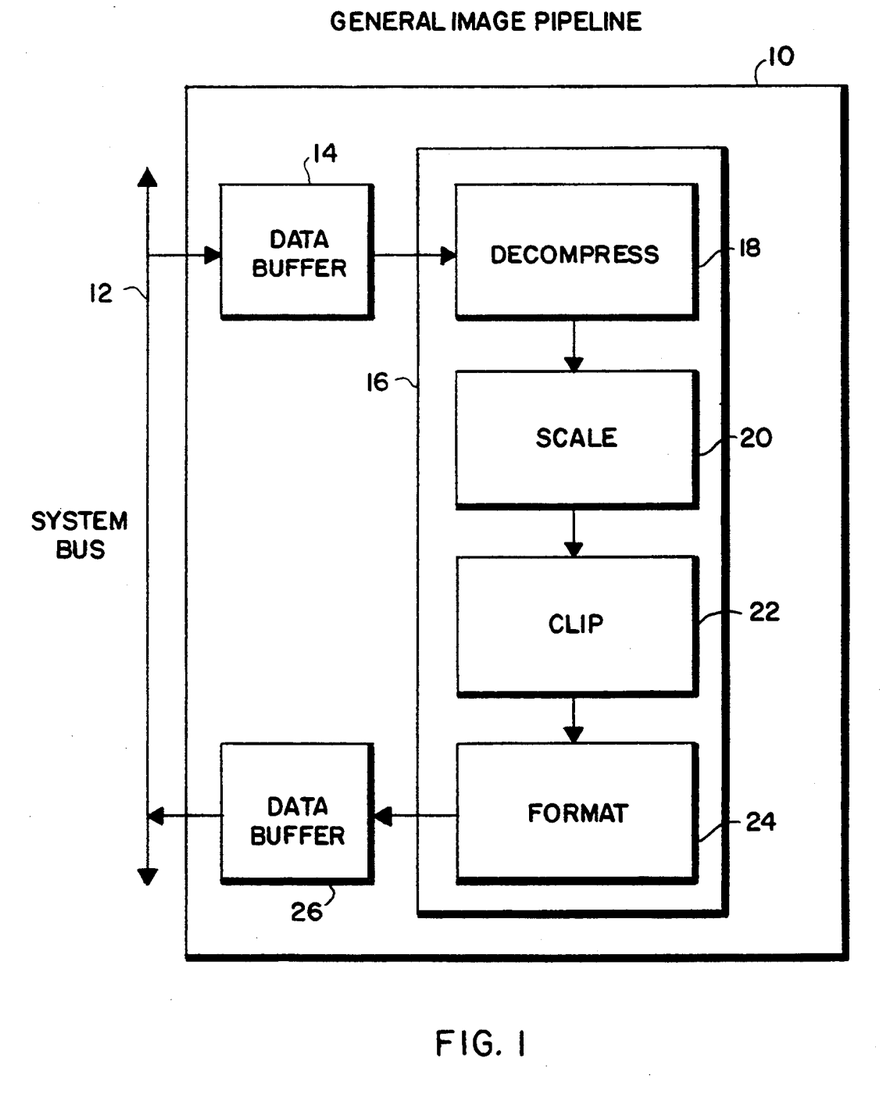
FIG. 1 is a block diagram of the general image pipeline of an image processing system comprising the clipping circuit of the present invention.

The clip registers of the present invention are part of a general image pipeline 10 within an image processing system as depicted in FIG. 1. Compressed image data from memory is transferred via the system bus 12 and enters the pipeline 10 via data buffer 14. The data is then passed into image accelerator 16 in which it is decompressed 18, scaled 20, clipped 22, and formatted 24. The processed data is then transferred from the accelerator 16 to the system bus 12 via data buffer 26.

The decompression process 18 reads the compressed image data and produces a data bit for each individual image pixel. Data bits are output by the decompression process 18 in scan line order. The details of the patented decompression process 18 are disclosed in U.S. Pat. No. 4,968,135. The decompressed data is then presented to the scaling process 20. The scaling process 20 converts the bitonal pixel data into gray scale data represented by eight bits per pixel to smooth image edges. The details of the patented scaling process 20 are disclosed in U.S. Pat. No. 4,829,589. The clipping process 22 then selects scaled image data within a pre-defined region of interest from the data for the entire image. This clipping 22 is the subject of the present invention and will be described below in detail. The clipped data is then formatted 24 to make it compatible with subsequent processes like display.

Figure 2:
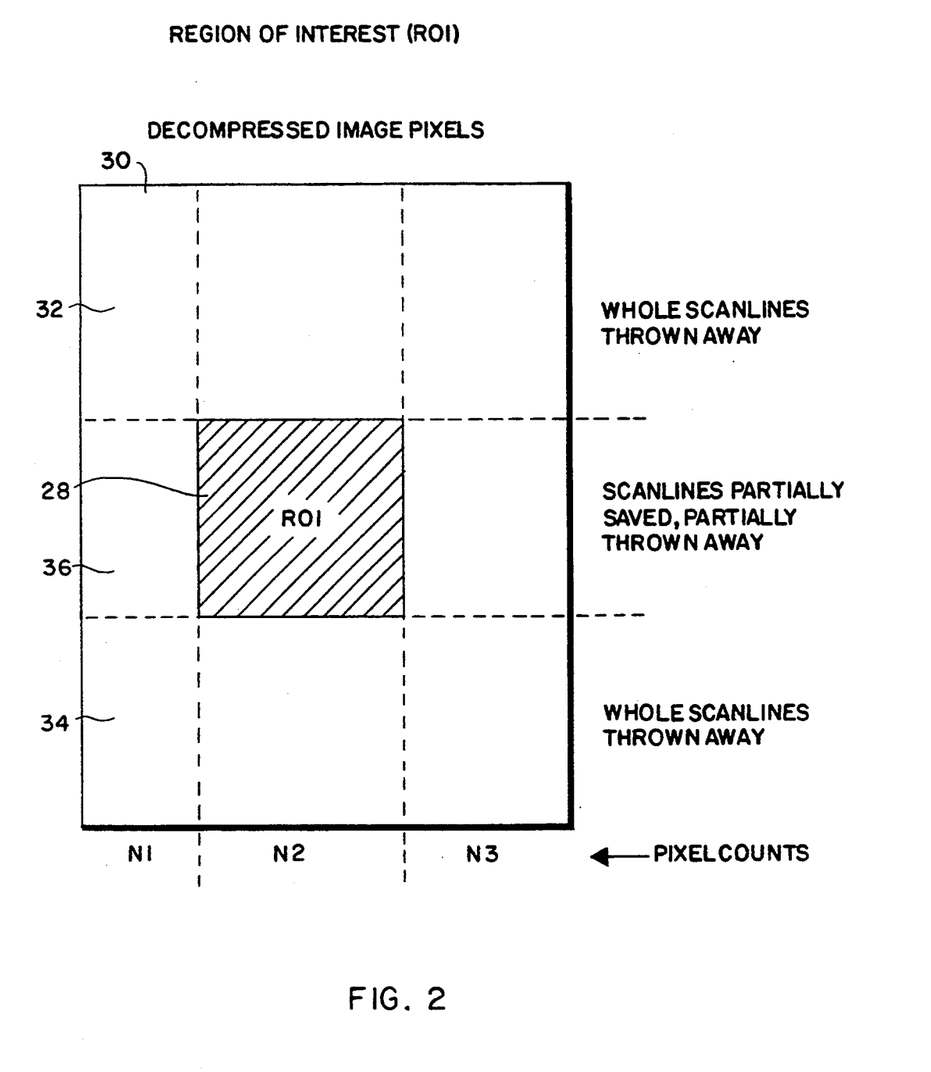
FIG. 2 depicts an image with a selected region of interest.

FIG. 2 depicts a region of interest (ROI) 28 within an image 30. The user defines the region by selecting a rectangle which contains all the desired data. The regions 32 and 34 in the image 30 above and below the region of interest 28 consist of entire scan lines which need not be processed. In addition, the scan lines 36 which contain the region of interest 28 are comprised of pixels both inside and outside the region 28. The quantity of pixels to the left, within, and to the right of the region 28 are determined from the definition of the region 28. N1 is the quantity of pixels in each scan line to the left of the region of interest 28; N3 is the quantity of pixels in each scan line to the right of the region 28; and N2 is the quantity of pixels in each scan line within the region 28. Those pixels outside the region of interest N1, N3 also need not be processed.

In decompression 18, values of the pixels in a region are derived from information which relates to and depends on information regarding pixels outside the region of interest 28. The compressed form description of pixel values may include pixels outside and inside the region 28. Therefore, even though the scan lines 32 above the region of interest 28 are not needed for display, they must be processed somehow in order to get to the region of interest 28 data. These scan lines are eliminated by the decompression process 18. As the process 18 outputs data one pixel at a time, it keeps track of the pixels and can identify the first pixel in each scan line. Consequently, it keeps track of the number of scan lines decompressed. When the region of interest 28 is defined, its location with respect to the scan lines in the image is known. Therefore, the number of scan lines 32 above the region 28 is a known quantity. In order to eliminate these scan lines 32 from processing, the decompression process 18 disables its output while it is producing data for them but continues counting the number of scan lines it has processed. When the count reaches the number of scan lines 32 above the region 28, the process 18 enables its output and begins outputting data for scan lines 36 which contain the region 28. Thus, the data defining scan lines 32 above the region of interest 28 are not passed to the scaling process 20. The scan lines 34 below the region of interest 28 are eliminated from processing by resetting the image pipeline 10 when the last scan line in the region of interest 28 is produced by the decompression process 18. As a result, the only scan lines which are completely processed by the image pipeline 10 are those which contain the region of interest 28.

FIG. 3 depicts the possible configurations of the scan lines 36 which contain the region of interest 28. In FIG. 3A, there are pixels in the scan lines 36 to the right of the region 28 but not to the left of the region 28. In FIG. 3B, there are pixels to both the left and the right of the region 28. In FIG. 3C, there are pixels in the scan lines 36 to the left of the region 28 but not to the right of the region 28. In FIG. 3D, the region 28 fills the scan lines 36. The present invention will select the pixels in the region 28 and pass them through the accelerator 16 for formatting 24 and output in all four cases.

Figure 4:
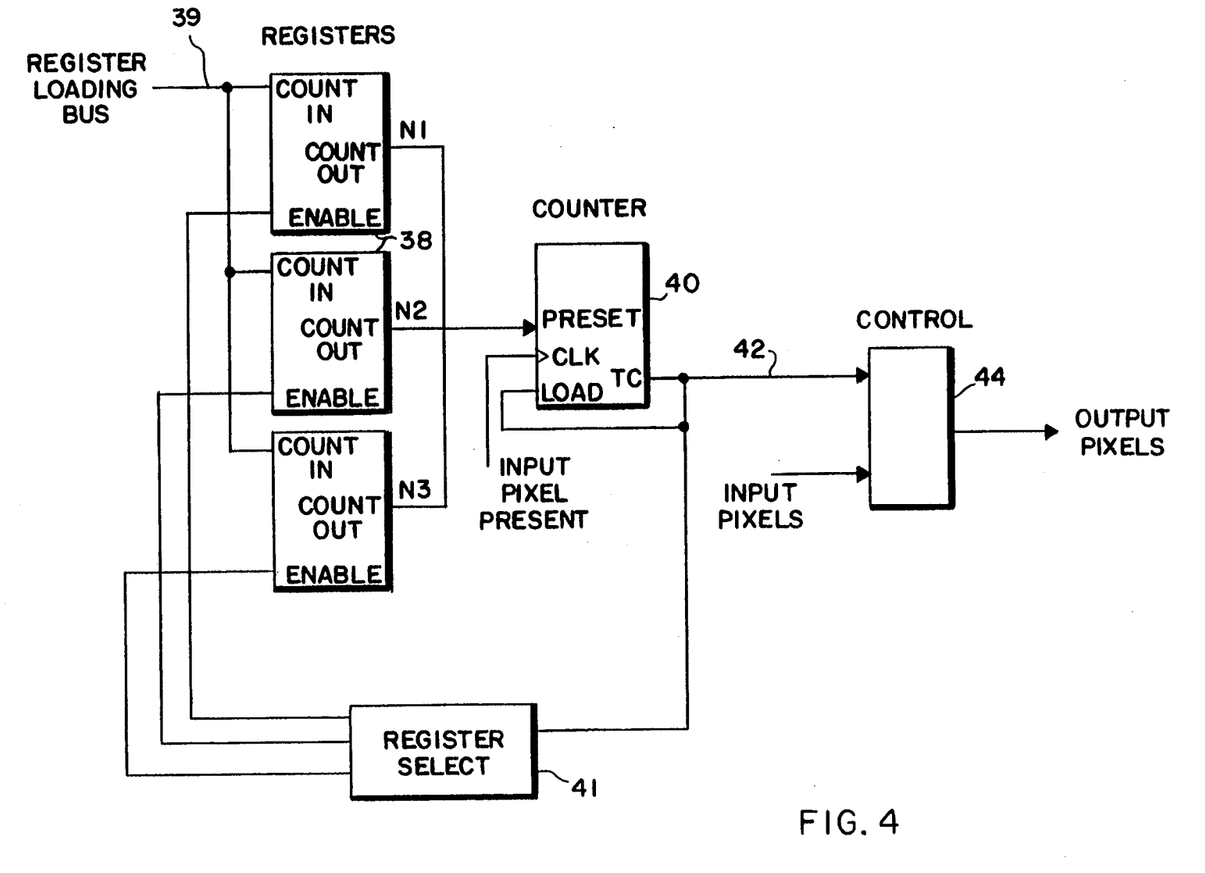
FIG. 4 is a block diagram of an embodiment of the present invention.

FIG. 4 depicts a block diagram of an embodiment of the present invention. Before pixel data begins being transferred into the pipeline 10, each of the three quantities N1, N2, and N3 is loaded into one of registers 38 via Register Loading Bus 39. The registers and counter are each M bits wide, where $M = \log_2 W$; W is the width in pixels of the widest image the system will process. When processing starts, the quantity N1 is loaded into the counter 40. Control circuit 44 is set to block input pixels. As each pixel from the scaling process 20 is applied to control circuit 44, an Input Pixel Present (IPP) signal is generated. The IPP signal is applied to the clock input of counter 40, causing the count to decrement once for each pixel. When the count reaches zero, pipeline 10 has received all of the pixels to the left of the region of interest 28 in the first scan line. The counter 40 generates a terminal count signal 42. The terminal count signal 42, via register select circuitry 41, causes quantity N2 to be loaded into the counter 40 and triggers control circuit 44 to begin passing input pixels.

Since N2 was loaded into the counter 40, the pixels being processed are within the region of interest 28. Therefore, control circuit 44 passes pixels. Again, as each pixel is processed, the counter 40 is decremented, so, when the count reaches zero, all of the pixels within the region of interest 28 which are in the first region scan line have been processed by the pipeline 10. The terminal count signal 42 causes quantity N3 to be loaded into the counter 40 and triggers control circuit 44 to block pixels.

When N3 is counted down, N1 is loaded into the counter 40, and the pixels to the left of the region of interest 28 in the second scan line are processed and blocked. This process continues until all of the scan lines containing the region of interest 28 have been processed. The result of the process is that only pixels within the region of interest 28 are passed through the pipeline 10 for processing and display.

If either N1 or N3 or both are zero, they will not be loaded into the counter 40. Because pixels enter the pipeline 10 at a constant high rate, the time required to load values into the counter 40 more than once in an effort to find a non-zero value in one of the registers 38 would cause the circuit to miss pixels. Pixels that should pass through the pipeline 10 would be blocked, or those that should be blocked would pass through. To eliminate this problem, before processing begins, register select circuitry 41 is set up such that during processing it will never enable a register 38 containing a zero value to load the counter 40.

Figure 5:
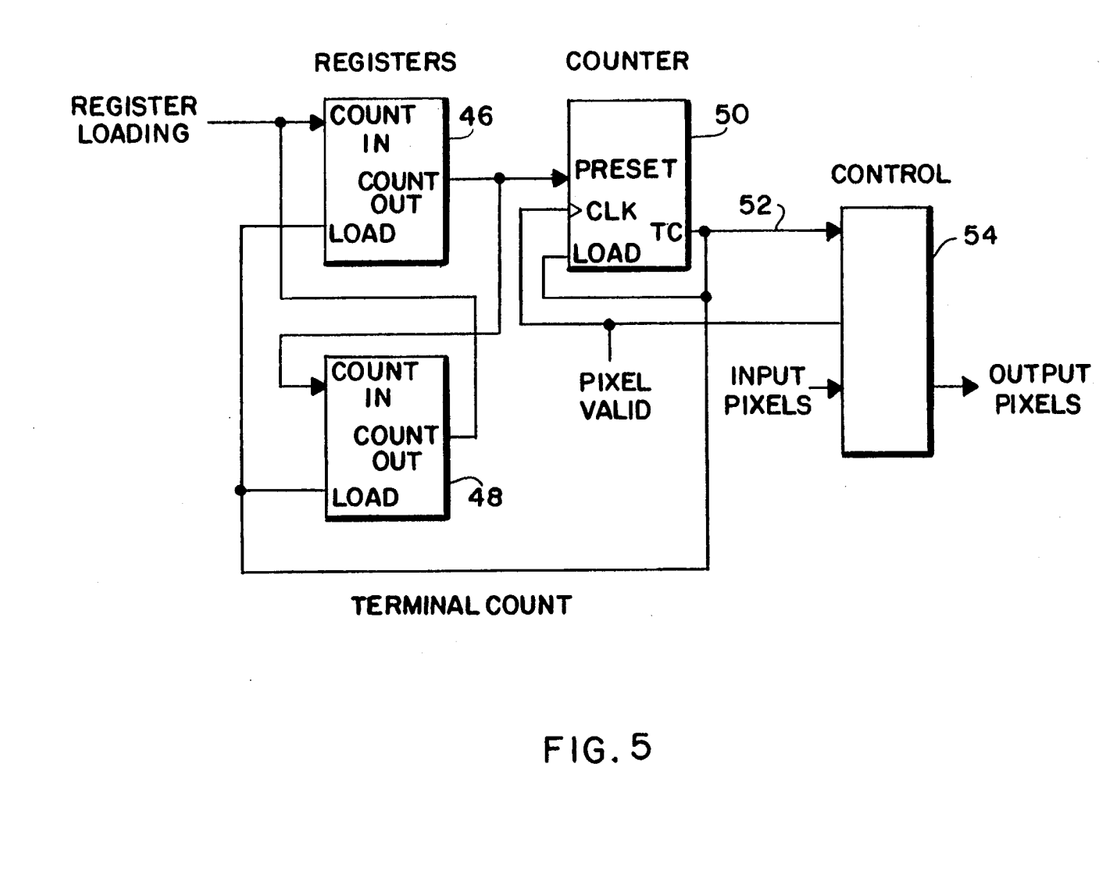
FIG. 5 is a block diagram of a preferred embodiment of the present invention.

FIG. 5 depicts a block diagram for a preferred embodiment of the present invention. A counter 50 decrements a pixel count each time a pixel enters the pipeline 10. A control circuit 54 either passes or blocks pixels based on whether the counter 50 is counting pixels within the region of interest 28. A substantial difference between this circuit and the previous embodiment is that, in this circuit, the counter 50 loads pixel quantities from one of two registers 46, 48 instead of three.

The use of only two registers is possible because as the decompression process 18 is producing pixels from the scan lines 36 containing the region of interest 28, the process is alternating between only two groups of pixels—those within the region of interest 28 and those outside of it. This is true regardless of the location of the region 28 within the scan lines 36. This concept is most clearly illustrated by FIGS. 3A and 3C. When processing scan lines in the case of FIG. 3A, the system starts with pixels within the region 28. When they are completed, pixels outside the region 28 are processed. Then the system processes pixels from the next scan line within the region 28. This process continues with the counter 50 alternately fading and counting only two different quantities. In the case of FIG. 3C, the process is identical except that the order in which the quantities are loaded is reversed. The process can also be seen to alternate between two quantities in the case of FIG. 3D where both of the quantities are the same, namely, N2, the quantity of pixels within the region 28.

Figure 3A:
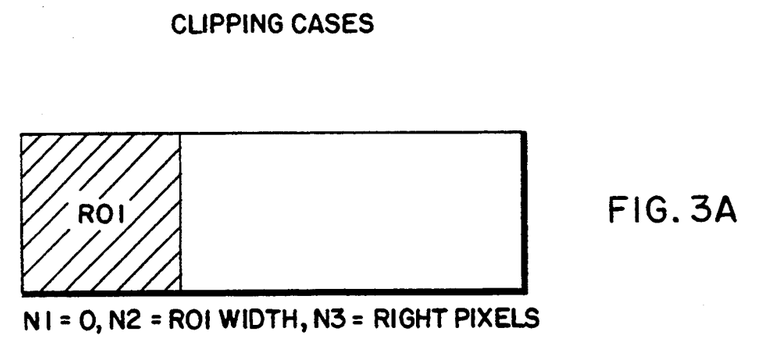
FIGS. 3A-3D show the possible locations of a region of interest within the group of scan lines which contains it.
Figure 3B:
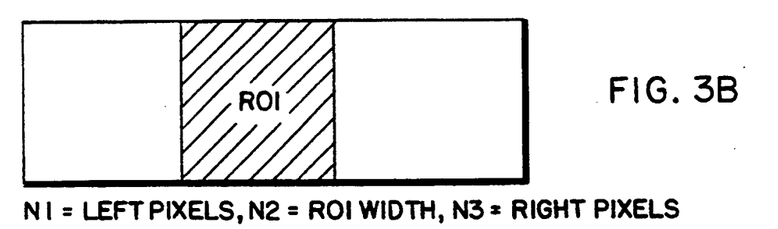
Figure 3C:
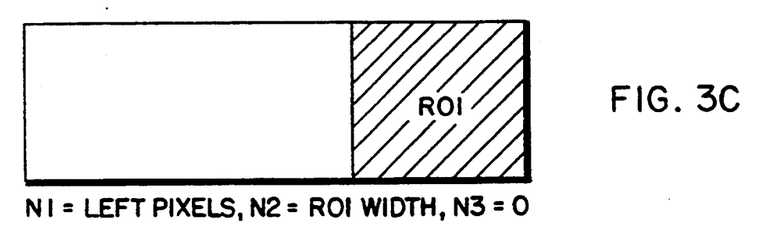
Figure 6:
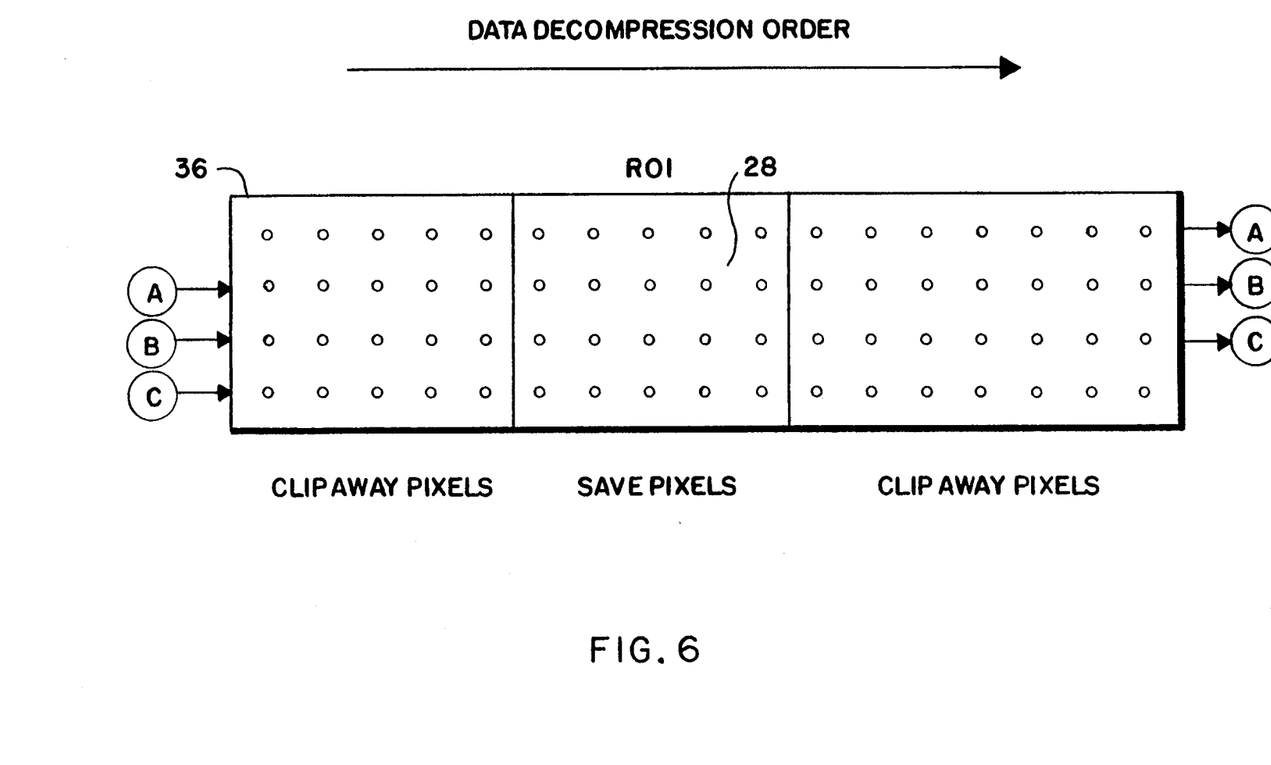
FIG. 6 shows the scan lines of pixels which contain the region of interest.

At first, the case of FIG. 3B may be seen as an exception to this concept. Because of the three distinct regions, it may be thought that it is necessary to stole three different quantities and cycle through them as one scan lines 36 are read. However, referring to the detailed drawing of the case of FIG. 3B in FIG. 6, it can be seen that after the pixels to the left of the region 28 in the first scan line are produced, the process proceeds as in the other cases. Again, the processing alternates between a group of pixels within the region 28 and a group of pixels outside the region 28. The group of pixels outside the region 28 is actually the combination of two groups of pixels. They are the pixels in a scan line to the right of the region 28 and the pixels in the next scan line to the left of the region 28. Because the data decompression process 18 presents pixels in scan line order, the latter will always follow the former in the stream of pixel data. Thus, the group of pixels outside the region 28 "wraps around" from the end of one scan line to the beginning of the next scan line up to the beginning of the region 28. Therefore, the two quantities of pixels alternately loaded into the counter 50 are the quantity of pixels in each scan line within the region 28 and the sum of the quantity of pixels in each scan line to the left of the region 28 and the quantity of pixels in each scan line to the right of the region 28.

Pixel quantities are loaded into the counter 50 via register 46. During clipping, the quantities alternately loaded into the counter 50 are stored in registers 46 and 48. After the contents of register 46 are loaded into the counter 50, they are switched with the contents of register 48. That is, the quantity stored in registor 46 is loaded into register 48, and the quantity stored in register 48 is loaded into register 46. As a result, when the pixel quantity being decremented by the counter 50 reaches zero, the other pixel quantity can be loaded into the counter 50, and the next group of pixels can be processed.

Before processing begins, the registers 46 and 48 and the counter 50 are loaded with appropriate pixel quantities. These quantities depend upon the region of interest case of FIG. 3. Register 46 is loaded with some initial pixel quantity. This quantity is then loaded into the counter 50. The quantity to be stored in register 48 when processing begins is then loaded into register 46. Next, the contents of registers 46 and 48 are switched. The quantity to be stored in register 46 is often loaded into register 46. The initial pixel quantity loaded into the counter 50 is chosen as the first quantity to be counted when processing begins. After this initial count is completed, processing all of the scan lines 36 can be completed with the counter 50 alternately counting the quantities initially stored in registers 46 and 48, beginning with the quantity initially stored in register 46.

The pixel quantities initially loaded into the registers 46 and 48 and the counter 50 depend on the location of the region of interest 28 (see FIG. 3). In FIG. 3A, the quantity loaded into the counter 50 is N2. N3 is loaded into register 46, and N2 is loaded into register 48. In FIG. 3B, N1 is loaded into the counter 50, N2 is loaded into register 46, and the sum N1+N3 is loaded onto register 48. In FIG. 3C, N1 is loaded into the counter 50, N2 is leaded into register 46, and N1 is loaded into register 48. In FIG. 3D, N2 is loaded into counter 50 and both registers 46 and 48. When the initial count is loaded into the counter 50, control circuit 54 is set to either block or pass pixels depending on whether the initial count loaded into the counter 50 corresponds to pixels outside the region of interest 28 or inside the region of interest 28. In FIG. 3A and 3D, the control circuit 54 is set to pass pixels. In FIGS. 3B and 3C, it is set to block pixels.

Processing begins when the decompression process 18 begins producing pixel data in scan line order. For each pixel applied at the control circuit 54, the Pixel Valid signal applied at the clock input of the counter 50 decrements the counter 50 by one. When the count reaches zero, the terminal count signal 52 is generated. The contents of register 46 are loaded into the counter 50 as a new count, and the contents of the two registers 46 and 48 are switched. The control circuit 54 toggles its state such that, if pixels were being passed during the previous count, they will now be blocked and if they were previously being blocked they will now be passed. When the new count is decremented to Zero, another count is loaded into the counter 50 from register 46, the registers 46 and 48 switch their contents, and the state of the control circuit 54 toggles again. This process continues until all of the scan lines 36 which contain the region of interest 28 have been processed.

The two-register approach of FIG. 5 has advantages over the three-register approach of FIG. 4. FIG. 5 allows a much more efficient implementation ir hardware. First, the circuit simply requires fewer registers, two instead of three. In addition, the associated control circuitry is much simpler. Because the processing alternates between only two quantities, keeping track of which group of pixels is being processed is easier. A simple flip-flop circuit 58 toggles between two states as the two different regions are read. In the three-register approach, additional complicated register select logic 41 is required to keep track of the last register and the next register to load the counter. Also, with the two-register approach, there is no need to check for zero values before loading the counter. Zero values are never loaded into the registers. In FIG. 3, for each case, only the non-zero values are loaded into the registers. Even in FIG. 3D, where two groups of pixels have zero quantities, the non-zero value N2 is loaded into both registers. This eliminates the zero detect circuitry 43 required in the three-register implementation.

Figure 7:
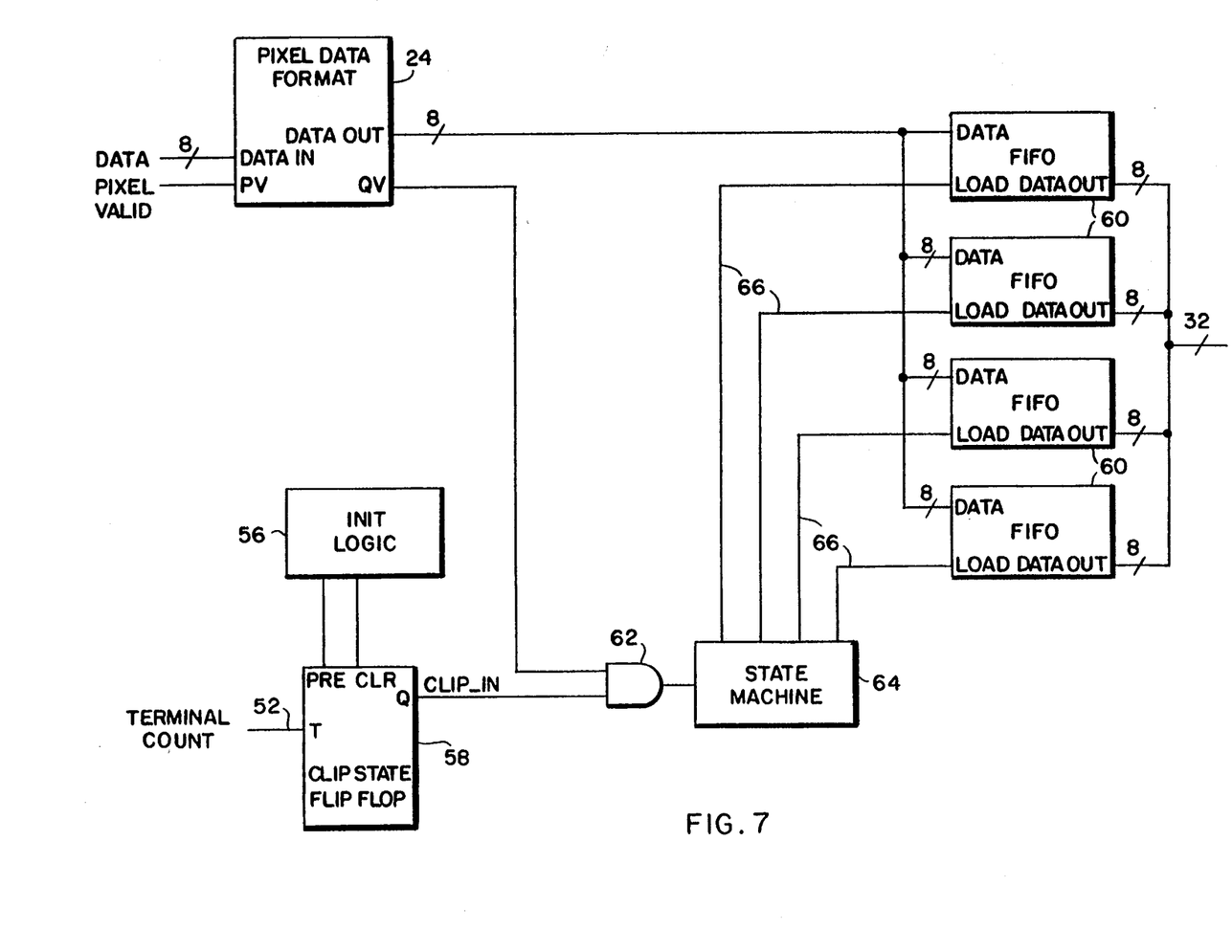
FIG. 7 is a detailed block diagram of control circuitry in the preferred embodiment of the present invention.

A detailed block diagram of the control circuit 54 is shown in FIG. 7. Before processing begins, INIT logic 56 determines which case in FIG. 3 is to be processed. This is accomplished by simply mapping the register load port into two different CPU addresses: a "start visible" address, and a "start clipped" address. The INIT logic detects which address the controlling software writes to, and, based on that determination, it either presets or clears clip state toggle flip-flop 58. For FIGS. 3B and 3C, the flip-flop 58 is cleared (CLIP_N is low); for FIGS. 3A and 3D, it is preset (CLIP_N is high). The output of flip-flop 58 (CLIP_N) is applied to an input of AND gate 62. When processing begins, pixel data from the scaling process 20 is applied to the control circuit. When each data pixel is applied, the Pixel Valid signal becomes active.

The eight-bits-per-pixel gray scale data from the scaling process 20 may not be compatible with the data output device. For example, a bitonal display may require that data be presented as one bit per pixel. To make it compatible with the output device, the data from the scaling process 20 is applied to a pixel data formatting process 24. At the same time, the Pixel Valid signal is also applied to the formatting process 24. The formatting process 24 inputs gray scale pixel data described by eight bits per pixel. It outputs data in the format required by the display device to be used, e.g., 1, 2, 4, or 8 bits per pixel, by keeping only the most significant bits of the eight bit input signal. The process 24 always packs its output into eight-bit bytes, regardless of the data format required by the output device. Consequently, the output data may represent 8, 4, 2, or 1 image pixels. When sufficient data to pack a byte has been formatted, the process 24 outputs the byte and simultaneously outputs a Qualified Valid signal. The output pixel data is applied to the inputs of four FIFO data storage circuits 60, and the QV signal is applied to an input of AND gate 62.

If CLIP_N is active, each time the QV signal becomes active, the output of AND gate 62 will become active. In response, state machine 64 will select a FIFO 60 to load the valid pixel data from the format process 24 by activating one of the FIFO load lines 66. Thus, when the output of flip-flop 58 is active, pixel data is passed through the pipeline 10 for processing.

Pixel data is output from the eight-bit FIFOs 60 to the 32-bit system bus 12. Each of the FIFOs 60 in turn contributes eight of the 32 bits in the bus. The number of pixels represented by these 32 bits depends on the packing scheme used by the formatting process 24. If the output device requires pixel data in eight-bits-per-pixel format, then each byte in the FIFOs 60 represents one pixel, and, therefore, each 32-bit word on the bus represents four pixels. If the output device requires one bit per pixel, then each byte in the FIFOs 60 was packed by the formatting process 24 such that it represents eight pixels. Consequently, each 32-bit bus word represents 32 pixels.

If CLIP_N is inactive, AND gate 62 is inactive. State machine 64 will not activate one of the FIFO load lines 66. The FIFOs 60 will not load pixel data, and, therefore, that data will not be passed.

Figure 3D:
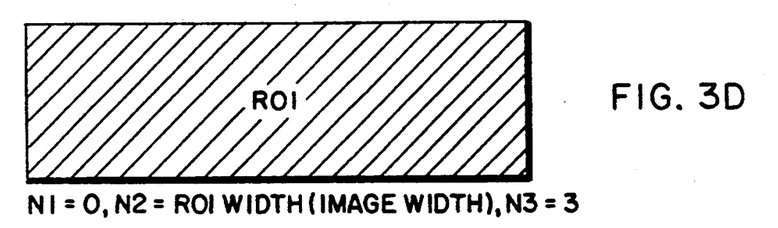

Thus, the state of the CLIP_N signal determines whether pixels will be passed or blocked. If it is active, they are passed; if it is inactive, they are blocked. Before processing begins, the INIT logic 56 sets CLIP_N to pass or block based on the region of interest case. When the initial group of pixels has been read, the terminal count signal 52 becomes active. Flip-flop 58 toggles, thus changing the state of CLIP_N. Using FIG. 3B as an illustration, N1 is initially loaded into counter 50, and INIT logic 56 initially clears flip-flop 58. As the pixels in the first scan line to the left of the region of interest 28 are input, they are blocked. When the count in the counter 50 reaches zero, N2 is loaded into the counter 50, and the terminal count signal 52 toggles flip-flop 58, causing CLIP_N to become active. As each pixel from the region of interest 28 is input, AND gate 62 causes state machine 64 to load the pixel data into a FIFO 60 to be passed along for processing. When the counter 50 reaches zero again, flip-flop 58 toggles and pixel data begins being blocked again if the INIT logic is not holding the PRESET signal to flip flop 58 active. If the INIT logic detects the case of FIG. 3D being set up by the software (detected by address selection), then the INIT logic 56 holds the PRESET signal to the flip flop 58 active for the whole clipping process, which guarantees that all pixels are passed, as FIG. 3D shows.

While this invention has been shown and described with references to preferred embodiments thereof, it will be understood by those skilled in the art that various changes in form and details may be made therein without departing from the spirit and scope of the invention as defined by the appended claims. Specifically, throughout the descriptions it is said that the counter used is initially loaded with a pixel quantity and then decremented to zero. One skilled in the art will understand that the system may also be implemented with a counter which counts up from zero and compares its value to the target pixel quantity. Such a system is not a departure from the spirit and scope of the invention. Also, neither the format logic 24 nor the scaling logic 20 are needed to accomplish the clipping functions. The output buffering FIFOs may be replaced with RAMs with address control logic or a Direct Memory Access (DMA) port into main memory.

In addition, to reduce the size of the clipping registers and counter required, a divide circuit (a simple counter) could be inserted between Pixel Valid signal and the clip counter clock signal. This would allow the clip counter to count quanta of pixels. The size of the quantum would depend on the size of the divide circuit ceunter. The divide circuit would be clocked by the Pixel Valid signal and provide the clock signal (its own Terminal Count signal) to the clock of the main clip counter. The divide circuit counter would not be loadable; it would be hard-wired to cycle at a given number of pixels (the quantum number).

We claim:

1. A clipping circuit in an image processing system for selecting data from the representation of an image comprised of scan lines of pixels, said clipping circuit comprising:
    a control circuit for passing pixel data values within a region of interest in a first pass state and blocking the pixel data values outside the region of interest in a second pass state;
    length registers for storing lengths of portions of scan lines within and outside of the region of interest; and
    a counter circuit coupled to receive lengths from the registers and to count pixel data values applied to the control circuit UP to one of the lengths from the registers, the counter circuit changing the control circuit pass state and resetting the counter circuit to count pixel data values applied to the control circuit up to another of the lengths from the registers on completion of the counting of the first length of pixel data values.

2. A clipping circuit as recited in claim 1 wherein a first length register and a second length register store the quantity of pixels in a scan line within the region of interest and the quantity of pixels in the scan line outside the region of interest.

3. A clipping circuit as recited in claim 2 wherein the counter circuit receives lengths from the first register, and the registers alternately store the two pixel quantities.

4. A clipping circuit as recited in claim 3 wherein a terminal count signal causes the quantity stored in the first register to be loaded into the counter and into the second register and the quantity stored in the second register to be loaded into the first register.

5. A clipping circuit as recited in claim 4 wherein an initial pixel quantity is loaded into the counter before image data is processed.

6. A clipping circuit as recited in claim 5 wherein the initial pixel quantity loaded into the counter and the quantities alternately stored in the registers are determined by the location of the region of interest within the group of scan lines which contains the region of interest.

7. A clipping circuit as recited in claim 6 wherein, if there are no pixels in each scan line to the left of the region of interest and there are pixels to the right of the region of interest, the initial quantity loaded into the counter is the quantity of pixels in each scan line within the region of interest, and the quantities alternately stored in the registers are the quantity of pixels in each scan line to the right of the region of interest and the quantity of pixels in each scan line within the region of interest.

8. A clipping circuit as recited in claim 6 wherein, if there are pixels in each scan line to both the left and the right of the region of interest, the initial quantity loaded into the counter is the quantity of pixels in each scan line to the left of the region of interest, and the quantities alternately stored in the registers are the quantity of pixels in each scan line within the region of interest and the sum of the quantities of pixels in each scan line to the left and right of the region of interest, such that, when pixels outside the region of interest are being processed, the counter counts the pixels to the right of the region of interest in the scan line plus the pixels to the left of the region of interest in the next scan line.

9. A clipping circuit as recited in claim 6 wherein, if there are pixels in each scan line to the left of the region of interest and there are no pixels to the right of the region of interest, the initial quantity loaded into the counter is the quantity of pixels in each scan line to the left of the region of interest, and the quantities alternately stored in the registers are the quantity of pixels in each scan line within the region of interest and the quantity of pixels in each scan line to the left of the region of interest.

10. A clipping circuit as recited in claim 6 wherein, if there are no pixels in each scan line outside the region of interest, the quantity of pixels in each scan line is initially loaded into the counter and stored in both of the registers.

11. In an image processing system, a method for selecting data from the representation of an image comprised of scan lines of pixels, said method comprising the steps of:
    storing pixel quantities in length registers, said quantities being determined by lengths of portions of scan lines within and outside of a region of interest;
    loading a counter circuit with lengths from the registers;
    counting pixel data values applied to a control circuit up to one of the lengths from the registers;
    changing a pass state of the control circuit and resetting the counter circuit to count pixel data values applied to the control circuit up to another of the lengths from the registers on completion of the counting of the first length of pixel data values; and
    passing pixel data values within the region of interest in a first control circuit pass state and blocking pixel data values outside the region of interest in a second pass state.

12. A method as recited in claim 11 wherein the storing step comprises storing in a first length register and a second length register the quantity of pixels in a scan line within the region of interest and the quantity of pixels in the scan line outside, the region of interest.

13. A method as recited in claim 12 wherein the loading step loads lengths from either register to the counter.

14. A method as recited in claim 13 wherein the loading step loads lengths from the first length register, and the storing step alternately stores the two pixel quantities in the two registers.

15. A method as recited in claim 14 wherein the changing step comprises loading the quantity stored in the first register into the counter and into the second register and loading the quantity stored in the second register into the first register.

16. A method as recited in claim 15 wherein the storing step loads the counter with an initial pixel quantity before image data is processed.

17. A method as recited in claim 16 wherein the initial pixel quantity loaded into the counter and the quantities alternately stored in the registers during the storing step are determined by the location of the region of interest within the group of scan lines which contains the region of interest.

18. A method as recited in claim 17 wherein, if there are no pixels in each scan line to the left of the region of interest and there are pixels to the right of the region of interest, the initial quantity loaded into the counter by the storing step is the quantity of pixels in each scan line within the region of interest, and the quantities alternately stored in the registers by the storing step are the quantity of pixels in each scan line to the right of the region of interest and the quantity of pixels in each scan line within the region of interest.

19. A method as recited in claim 17 wherein, if there are pixels in each scan line to both the left and the right of the region of interest, the initial quantity loaded into the counter by the storing step is the quantity of pixels in each scan line to the left of the region of interest, and the quantities alternately stored in the registers by the storing step are the quantity of pixels in each scan line within the region of interest and the sum of the quantities of pixels in each scan line to the left and right of the region of interest, such that when pixels outside the region of interest are being processed, the count decremented by the counter during the decrementing step counts the pixels in the scan line to the right of the region of interest plus the pixels in the next scan line to the left of the region of interest.

20. A method as recited in claim 17 wherein, if there are pixels in each scan line to the left of the region of interest and there are no pixels to the right of the region of interest, the initial quantity loaded into the counter by the storing step is the quantity of pixels in each scan line to the left of the region of interest, and the quantities alternately stored in the registers by the storing step are the quantity of pixels in each scan line within the region of interest and the quantity of pixels in each scan line to the left of the region of interest.

21. A method as recited in claim 17 wherein, if there are no pixels in the scan lines outside the region of interest, the quantity of pixels in each scan line is initially loaded into the counter and stored in both registers by the storing step.

22. A method as recited in claim 11 wherein the storing step comprises:
    storing the quantity of pixels in a scan line to the left of the region of interest in a first length register;
    storing the quantity of pixels in a scan line within the region of interest in a second length register; and
    storing the quantity of pixels in a scan line to the right of the region of interest in a third length register.

* * * * *